(12) United States Patent
Barros Alonso

(10) Patent No.: US 9,988,000 B2
(45) Date of Patent: Jun. 5, 2018

(54) BADGE ASSEMBLY FOR BEING CONNECTED TO AN AIRBAG COVER, AIRBAG COVER, AIRBAG MODULE AND VEHICLE STEERING WHEEL COMPRISING SUCH BADGE ASSEMBLY

(71) Applicant: Dalphi Metal Espana S.A., Vigo (ES)

(72) Inventor: Ruben Barros Alonso, Vigo (ES)

(73) Assignee: Dalphi Metal Espana S.A. (ES)

( * ) Notice: Subject to any disclaimer, the term of this patent is extended or adjusted under 35 U.S.C. 154(b) by 0 days. days.

(21) Appl. No.: 14/927,573

(22) Filed: Oct. 30, 2015

(65) Prior Publication Data

US 2016/0121809 A1   May 5, 2016

(30) Foreign Application Priority Data

Nov. 5, 2014   (DE) .................... 20 2014 008 757 U

(51) Int. Cl.
| | |
|---|---|
| *B60R 13/00* | (2006.01) |
| *B60R 21/203* | (2006.01) |
| *B60R 21/2165* | (2011.01) |
| *B60R 21/215* | (2011.01) |
| *B62D 1/04* | (2006.01) |

(52) U.S. Cl.
CPC .......... *B60R 13/005* (2013.01); *B60R 21/203* (2013.01); *B60R 21/215* (2013.01); *B60R 21/21656* (2013.01); *B62D 1/04* (2013.01); *B60R 2021/21543* (2013.01)

(58) Field of Classification Search
CPC ................ B60R 13/005; B60R 21/215; B60R 2021/21543
See application file for complete search history.

(56) References Cited

U.S. PATENT DOCUMENTS

| | | | | |
|---|---|---|---|---|
| 5,678,851 | A | * | 10/1997 | Saito .................... B60R 13/0206 280/728.3 |
| 5,685,056 | A | * | 11/1997 | Fischer ................. B60R 13/005 280/728.3 |
| 5,775,721 | A | * | 7/1998 | Grout .................... B60R 21/215 280/727 |
| 5,851,022 | A | | 12/1998 | Yamamoto et al. |
| 6,581,311 | B1 | * | 6/2003 | Davey ................... B60R 13/005 296/214 |
| 6,613,415 | B2 | * | 9/2003 | Iida ......................... B29C 65/08 264/135 |
| 7,766,371 | B2 | * | 8/2010 | Fujimori ........... B60R 21/21656 280/728.3 |

(Continued)

*Primary Examiner* — Barry Gooden, Jr.
(74) *Attorney, Agent, or Firm* — Tarolli, Sundheim, Covell & Tummino LLP

(57) ABSTRACT

The invention relates to a badge assembly for being connected to an airbag cover composing a badge (10) and a retaining plate (20) adapted to be clip-connected to each other, wherein the badge comprises positioning pins (17) which are adapted to be tightly connected to positioning seats (23) of the retaining element. The invention excels by the fact that the badge (10) includes a decoration element (12) and a carrier element (13) being tightly connected to each other, wherein the carrier element (13) comprises the positioning pins (17). The invention further relates to an airbag cover, an airbag module and a vehicle steering wheel comprising said badge assembly as well as a manufacturing method.

26 Claims, 2 Drawing Sheets

(56) References Cited

U.S. PATENT DOCUMENTS

| | | | |
|---|---|---|---|
| 7,775,550 B2* | 8/2010 | Dominguez Aparicio et al. | B60R 21/2165 280/728.3 |
| 8,459,713 B2* | 6/2013 | Sella | B60R 21/215 280/728.3 |
| 9,027,955 B2* | 5/2015 | Muramatsu | B60R 21/2165 280/728.2 |
| 9,150,165 B1* | 10/2015 | Fortin | B60R 13/005 |
| 2005/0067815 A1* | 3/2005 | Dearden | B60R 21/21656 280/728.3 |
| 2006/0023468 A1* | 2/2006 | Takahashi | B60R 13/005 362/555 |
| 2008/0005874 A1 | 1/2008 | Keller | |
| 2008/0079241 A1* | 4/2008 | Fujimori | B60R 21/21656 280/727 |
| 2008/0090031 A1* | 4/2008 | Hirzmann | B60R 13/005 428/31 |
| 2008/0116667 A1* | 5/2008 | Schulze | B29C 66/21 280/728.1 |
| 2008/0252050 A1* | 10/2008 | Aparicio | B60R 21/2165 280/728.3 |
| 2009/0315306 A1* | 12/2009 | Worrell | B60Q 3/024 280/731 |
| 2011/0052839 A1* | 3/2011 | Pierce | B60R 13/005 428/31 |
| 2012/0228855 A1* | 9/2012 | Yamaji | B60Q 5/003 280/731 |
| 2012/0256543 A1* | 10/2012 | Marcove | B60Q 1/2607 315/77 |
| 2013/0107046 A1* | 5/2013 | Forgue | B60R 11/04 348/148 |
| 2013/0277952 A1* | 10/2013 | Jung | B60R 21/2165 280/728.3 |
| 2013/0285355 A1* | 10/2013 | Muramatsu | B60R 21/215 280/728.3 |
| 2014/0145419 A1* | 5/2014 | Ishikawa | B60R 21/215 280/728.3 |
| 2014/0210190 A1* | 7/2014 | Bosch | B60R 21/203 280/728.3 |
| 2014/0210191 A1* | 7/2014 | Bosch | B60R 21/203 280/728.3 |
| 2015/0232130 A1* | 8/2015 | Colombo | F16B 5/0657 403/14 |
| 2015/0251625 A1* | 9/2015 | Bana Castro | B60R 21/203 280/728.3 |
| 2015/0274217 A1* | 10/2015 | Colombo | F16B 5/0628 403/14 |

* cited by examiner

BADGE ASSEMBLY FOR BEING CONNECTED TO AN AIRBAG COVER, AIRBAG COVER, AIRBAG MODULE AND VEHICLE STEERING WHEEL COMPRISING SUCH BADGE ASSEMBLY

RELATED APPLICATION

This application claims priority from German Application No. 20 2014 008 757.1, filed Nov. 5, 2014, the subject matter of which is incorporated herein by reference in its entirety.

BACKGROUND OF THE INVENTION

The invention relates to a badge assembly for being connected to an airbag cover in accordance with the preamble of claim 1. Furthermore, the invention relates to an airbag cover, an airbag module and a vehicle steering wheel comprising such badge assembly. A badge assembly of the afore-mentioned type is known, for example, from U.S. Pat. No. 7,775,550 B2.

The badge assembly known from prior art comprises a badge and a retaining plate, with the badge having a multi-part configuration. Especially, the badge comprises plural individual decoration elements each of which includes fastening pins. In the mounted state the fastening pins extend through the airbag cover and are fixed on a rear side of the airbag cover in a retaining plate. A drawback of the known badge assembly consists in the material expenditure for the decoration elements. The latter are frequently made of comparatively high-quality material such as aluminum so as to achieve an esthetically attractive appearance. In total, the known badge assembly thus includes a relatively high proportion of high-quality materials which results in increased material costs.

It is the object of the invention to state a badge assembly retaining high-quality appearance while being simultaneously adapted to be manufactured at reduced material costs. It is a further object of the invention to state an airbag cover, an airbag module as well as a vehicle steering wheel comprising such badge assembly.

In accordance with the invention, this object is achieved as regards the badge assembly by the subject matter of claim 1, as regards the airbag cover by the subject matter of claim 11, as regards the airbag module by the subject matter of claim 13, as regards the vehicle steering wheel by the subject matter of claim 14 and as regards the manufacturing method by the subject matter of claim 15.

The object is especially achieved by a badge assembly for connection to an airbag cover which includes a badge and a retaining plate. The badge and the retaining plate can be clip-connected to each other, wherein the badge comprises positioning pins which can be inseparably connected to positioning acceptances of the retaining plate and, resp., of a retaining element.

The badge can include a decoration element and a carrier element which are connectable or, resp., connected to each other (especially permanently).

The decoration element and the carrier element can also be formed in one piece, i.e. can be formed of plastic material, preferably being coated with a metallic layer, and can thus form the badge or part of the badge.

Furthermore, the decoration element and the carrier element may form a logo component (14) adapted to be arranged inside a design component (15) of the badge (10).

The carrier element can comprise the positioning pins. The design component, too, can include a plurality of, preferably two, three, four, five or six, positioning pins adapted to be inseparably connected to positioning acceptances of the retaining plate.

Hence, in the invention the badge is advantageously configured in multi-part form, wherein especially a division into a decoration element and a carrier element and/or a design component is made. The carrier element and/or the design component include the positioning pins. The positioning pins at least serve for positioning the badge relative to the retaining plate. Moreover, the positioning pins can be in the form of clip connectors and in this way also can serve for connecting the badge to the retaining plate. Accordingly, the positioning seats can be in the form of clip seats. The decoration element, on the other hand, provides for an optically attractive appearance of the badge assembly. This separation of function between the optical appearance and the fastening function allows reducing the expenditure of material for high-quality materials that can be used for forming the decoration element. In this way the positioning pine are especially prevented from having to be manufactured of a relatively high-quality material as this has been the case in prior art. Rather, the carrier element can be made of inexpensive material, allowing for reduction of the total manufacturing costs for the badge assembly.

It is preferred that the decoration element includes a material different from that of the carrier element. By the use of different materials the cost advantage is exploited in an especially efficient manner. It can especially be provided that the decoration element includes a material of higher quality than that of the carrier element. For example, the decoration element can foe formed by an aluminum sheet.

In preferred embodiments the decoration element can be glued to the carrier element. The gluing allows an especially simple and tight connection between the decoration element and the carrier element so that in total a badge is formed which can be handled uniformly.

Alternatively, the decoration element can also foe crimped, clamped, pressed or looked with the carrier element. In particular, jointly with the decoration element the carrier element can form a logo component adapted to be arranged inside a design component of the badge.

In general the badge may be formed of plural individual components. It is especially preferred that together with the carrier element the decoration element forms a logo component adapted to be handled uniformly which in turn is connectable to a design component of the badge. The individual components, especially the logo component and the design component, can be tightly connectable to each other so that altogether a badge capable of being handled uniformly is formed.

The multi-part badge is configured, according to an optional additional aspect of the invention, so that it is connectable to the retaining plate as an assembly (in one working step).

Each of the design component and the decoration element may be formed of high-quality materials. It is also possible that the design component itself is formed by a decoration element and a carrier element. The design component can also be formed by a plastic member chrome-plated on its surface.

In a preferred embodiment, the design component includes two logo seats into which the logo component can be inserted. This ensures a positive connection between the design component and the logo component. Concretely speaking, the logo seats can be delimited toward a front side of the badge so that the logo component can be fixed to the retaining plate by the design component. The design component may comprise clip connectors which interact with clip seats of the retaining plate for fixing the badge to the retaining plate and/or to the airbag cover. In other words, the design component may partly overlap the logo component so that the logo component is held on the retaining plate in addition to being fastened by the positioning pins or exclusively by the design component. In any case, the design component can serve as hold-down device for the logo component.

The design component can be of annular shape. It is advantageously provided that the logo seats are arranged on an inner periphery of the design component. The logo component can extend radially through the design component and can engage in the respective oppositely arranged logo seats of the design component. A different alignment of the logo seats, for example at an angle relative to the center of the annular design component, is possible. It is equally possible to provide two, three or four logo seats (16) into which the logo component (14) can be inserted.

In another preferred variant of the badge assembly according to the invention, it is provided that the decoration element has a cap-like shape and the cap-like shape includes four side faces and one front face. The decoration element in so far encompasses the carrier element on several sides so that the carrier element is no longer visible from a front side of the badge. The carrier element is rather enclosed by the decoration element in a cap-like manner. In particular, the carrier element can be embedded in the cap-like decoration element so that merely a rear face or the carrier element is exposed. The rear face is adjacent to the airbag cover in the mounted state and thus is no longer visible from outside.

The retaining plate which in the mounted state of the badge assembly is preferably arranged on a rear side of the airbag cover can have at least one predetermined breaking line. It can especially be provided that one or more predetermined breaking lines which yield upon opening of the airbag cover and thus facilitate the release of an airbag, for example driver airbag, arranged beneath the airbag cover extend through the entire retaining plate.

In accordance with an independent aspect, the invention is based on the idea to describe an airbag cover, especially for a steering wheel, comprising an afore-described badge assembly. The badge assembly is preferably connected to a front plate of the airbag cover. In a preferred embodiment of the airbag cover according to the invention, the front plate may include a tear line. The tear line facilitates the release of an airbag adapted to be arranged beneath the airbag cover. It is especially preferred that the retaining plate of the badge assembly is arranged on the front plate such that the predetermined breaking line of the retaining plate is oriented along the tear line of the front plate and is in alignment with the tear line, respectively. Thus it is ensured that the airbag cover including the retaining plate and, resp., the badge assembly can be split so as to release an airbag upon activation thereof.

Another independent aspect of the invention relates to an airbag module including an afore-described airbag cover and/or an afore-described badge assembly. The airbag module further can include at least one airbag, for example a driver airbag, as well as an inflator being in fluid communication with the airbag.

Another independent aspect of the invention relates to a vehicle steering wheel comprising said airbag module and/or an afore-described airbag cover and, resp., an afore-described badge assembly.

Within the scope of the present application, moreover a method of manufacturing an airbag cover is disclosed, with the following steps being carried out. Forming a logo component by connecting a decoration element to a carrier element; arranging the logo component in logo recesses of a design component for forming a badge; plug-connecting the badge to the airbag cover, wherein at least one positioning pin of the badge passes through a front plate of the airbag cover; attaching a retaining plate to the badge so that the front plate of the airbag cover is clamped between the badge and the retaining plate and the retaining plate is non-detachably connected to the badge.

Preferably, upon attaching the retaining plate to the badge, the positioning pins of the badge engage in positioning seats of the retaining plate so that a relative position is defined between the badge and the retaining plate, especially between the badge and the airbag cover. The positioning pins can also be in the form of clip connectors and the positioning seats can be in the form of clip seats so that a tight clip connection is provided and the retaining plate cannot be detached from the badge in a non-destructive manner.

BRIEF DESERTION OF THE DRAWINGS

Hereinafter the invention will be illustrated by way of an embodiment with reference to the enclosed schematic drawings, in which FIG. 1 shows a perspective exploded view of a badge of the badge assembly according to the invention in accordance with a preferred embodiment;

DESCRIPTION

Figure 1:
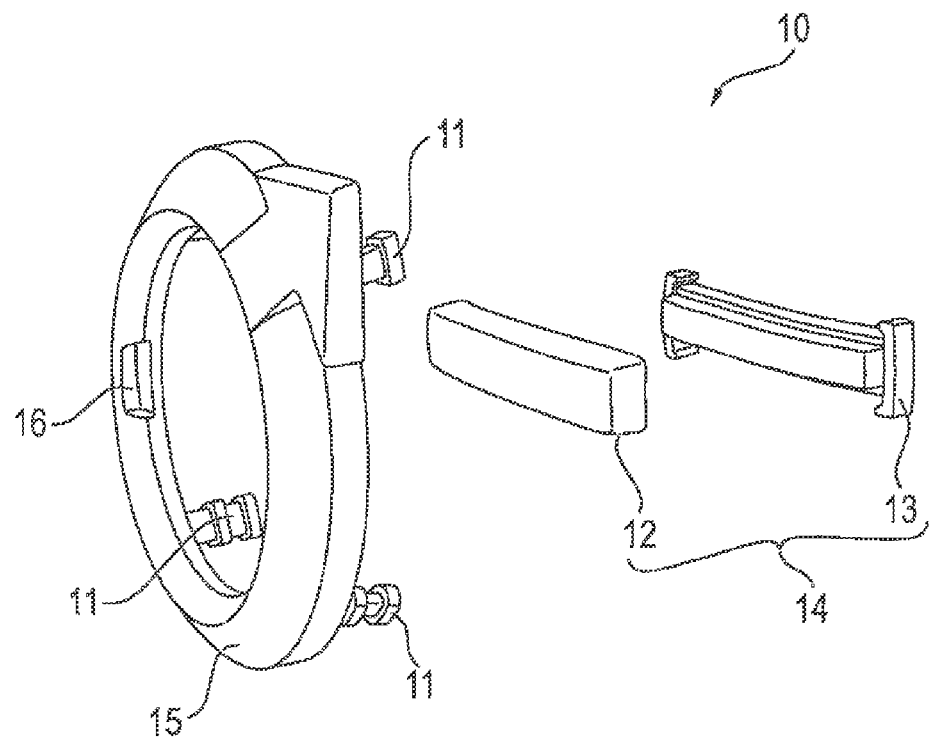

In the enclosed drawings a badge assembly is described which is generally formed by a badge 10 and a retaining plate 20. The badge 10 comprises plural components, especially a logo component 14 and a design component 15. The logo component 14 in turn is formed by a decoration element 12 and a carrier element 13. In total, the badge 10 of the badge assembly has a multi-part design. For being connected to the retaining plate 20 the badge 10 includes clip connectors 11 that are adapted to engage in corresponding clip seats 21 of the retaining plate 20 so as to tightly connect the badge 10 to the retaining plate 20. The clip connectors 11 preferably are arranged on the design component 15. On the logo component 14 positioning pins 17 are arranged for interacting with positioning seats 23 of the retaining plate 20 so as to attain exact positioning of the logo component 14 relative to the design component 15. The positioning pins 17 and the positioning seats 23 may also provide a clip connection, i.e. they can be in the form of clip connectors 11 and clip seats 12.

In FIG. 1 the individual elements of the badge 10 are shown. It is especially visible that the badge 10 includes the design component 15 which has a substantially annular shape. The design component 15 may be formed of plastic material provided with a chrome layer so as to enhance the optical appearance of the design component 15. On a rear side the design component 15 includes clip connectors 11 which are arranged to be complementary to clip seats 21 of the retaining plate 20. It is further evident from FIG. 1 that logo seats 16 are arranged at an inner periphery of the design component 15. Especially two logo seats 16 are provided which are arranged to be radially opposed on an inner periphery of the design component 15. The logo seats 16 are open toward a rear side of the design component 15 and are delimited toward a front side of the design component 15. The shape of the logo seats 16 substantially corresponds to the cross-sectional shape of the logo component 14 so that positive mounting of the logo component 14 in the design component 15 is facilitated.

The logo component 14 comprises a decoration element 12 and a carrier element 13. The decoration element 12 and the carrier element 13 are preferably made of different materials. For example, the carrier element 13 may include plastic material and the decoration element 12 may be formed by an aluminum sheet member. The decoration element 12 preferably bears the logo or the brand of a oar manufacturer. In the exploded view according to FIG. 1 the structure of the badge 10 is clearly visible. It is especially illustrated that the logo component 14 is composed, on the one hand, of the decoration element 12 and, on the other hand, of the carrier element 13. The decoration element 12 exhibits a cap-like shape including a front face bearing the logo of the car manufacturer as well as four side faces. The carrier element 13 is shaped so as to be capable of being inserted in the decoration element 12 so that the decoration element 12 encompasses the carrier element 13 on five sides. The rear side of the carrier element 13 is left free.

Figure 2:
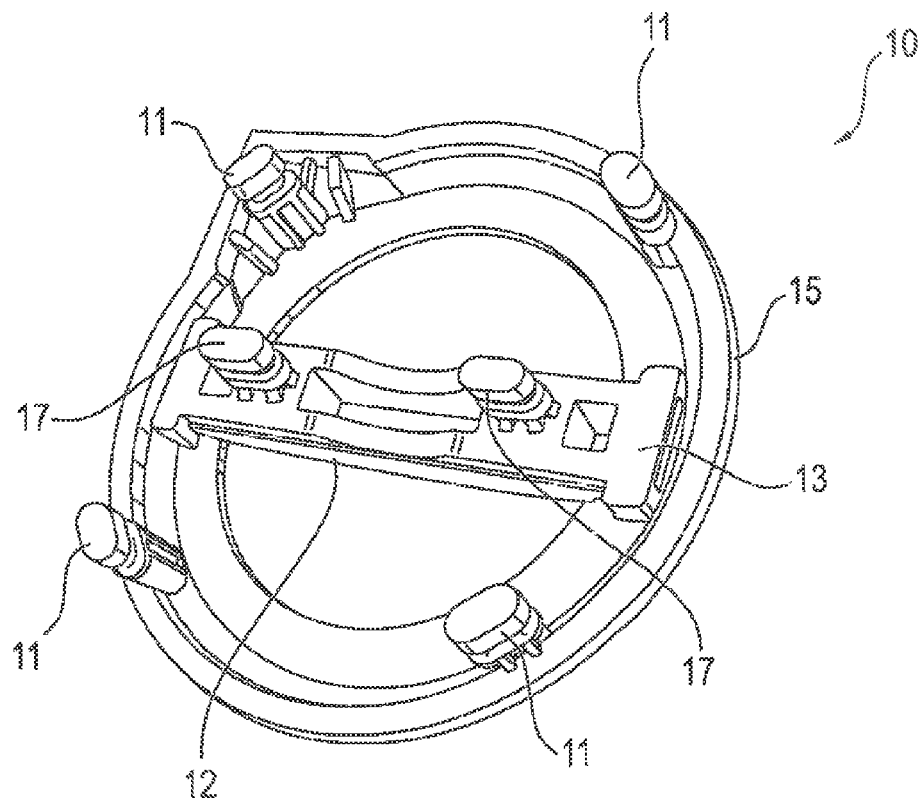
FIG. 2 shows a perspective rear view of the badge according to FIG. 1 in the assembled state.

As is clearly visible from FIG. 2, on its rear side the carrier element 13 includes positioning pins 17 which are substantially oval and are adapted to engage in corresponding positioning seats 18 of the retaining plate 20. The retaining plate 20 including its positioning seats 23 and clip seats 21 is exemplified in FIG. 4. Furthermore, it is visible in FIG. 2 that the design component 15 supports plural clip connectors 11 the position of which matches the positions of clip seats 21 of the retaining plate 20.

Figure 3:
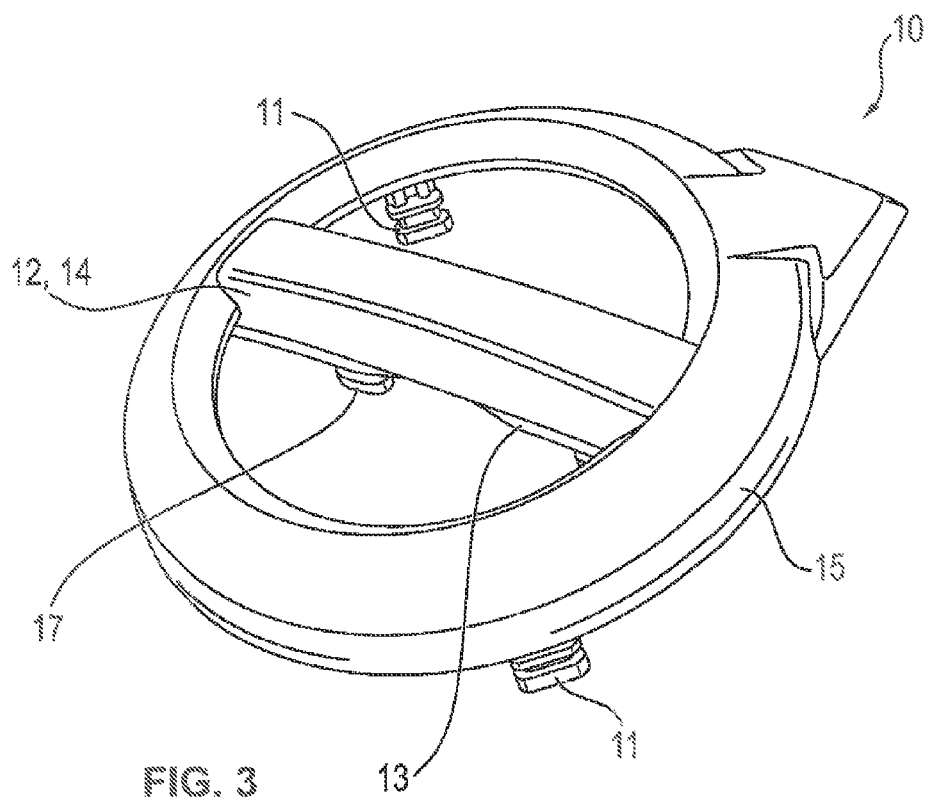
FIG. 3 shows a perspective front view of the badge according to FIGS. 1 and 2.

FIG. 3 illustrates the badge 10 in the mounted state. It is clearly evident that there is a plurality of design options due to the multi-part configuration of the badge. For example, the material of the design component 16 and of the decoration element 12 can be selected to be different so as to reproduce an appropriately desired appearance. It is also possible that the design component 15 and the decoration element 12 show different colors so that a multi-color badge 10 can be produced by simple means.

Figure 4:
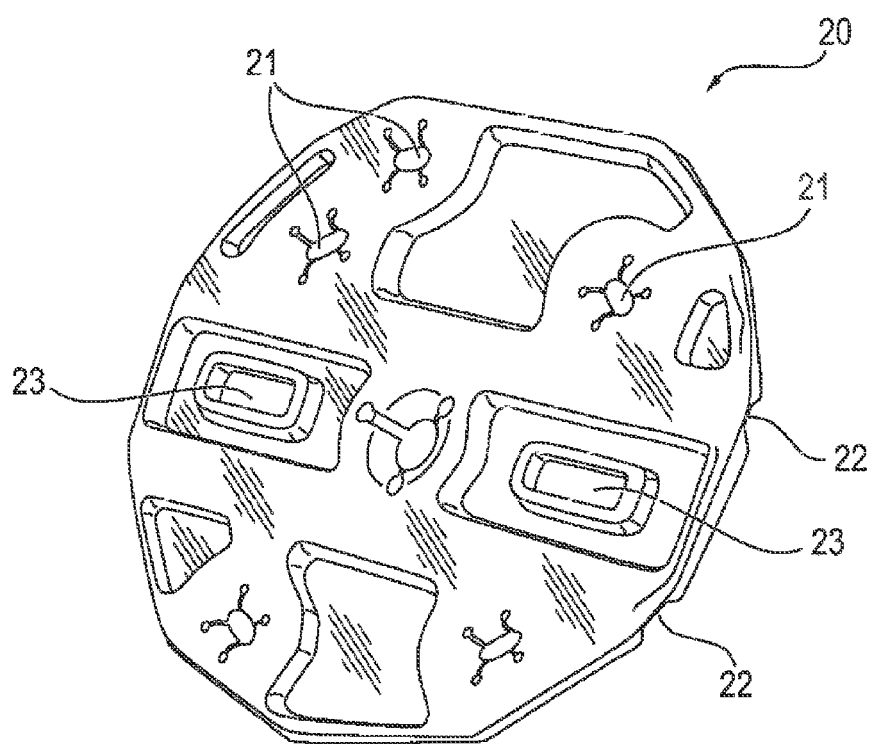
FIG. 4 shows a perspective front view of a retaining plate of the badge assembly according to the invention which is adapted to be connected to the badge according to FIG. 2.

In FIG. 4 the retaining plate 20 is shown which includes plural partly irregularly spread clip seats 21. The clip seats 21 are oriented such that the clip connectors 11 of the badge 10 are adapted to engage in the clip seats 21. The clip seats 21 are designed so that it is not possible to release the connection between the retaining plate 20 and the badge 10 in a non-destructive manner. The positioning seats 23 into which the positioning pins 17 can engage for achieving an exact alignment of the badge 10 relative to the retaining plate 20 are arranged in the center of the retaining plate 20. The positioning seats 23 can be configured in a way similar to the dip seats 21. Accordingly, the positioning pins 17 can be configured in a way similar to the clip connectors 11 so that the positioning pins 17 may be engaged in the positioning seats 23 so as to tightly connect the logo component 14 to the retaining plate 20. However, it is generally provided to fix the logo component 14 to the retaining plate 20 indirectly through the design component 15, wherein the logo component 14 is arranged in the logo seats 16 of the design component 15. In this way, the design component 15 constitutes a hold-down device for the logo component 14.

Furthermore, it is indicated in the perspective view according to FIG. 4 that the retaining plate 20 includes two predetermined breaking lines 22 formed on a rear side of the retaining plate 20. The predetermined breaking lines 22 can be arranged on an airbag cover to be aligned with a tear line of the airbag cover so that the retaining plate 20 breaks when the airbag cover opens for deployment of an airbag. In this context, it is equally advantageous to design also the badge 10, especially the design component 15, to be breakable.

LIST OF REFERENCE NUMERALS 10 badge
11 clip connector
12 decoration element
13 carrier element
14 logo component
15 design component
16 logo seat
17 positioning pin
20 retaining plate
21 clip seat
22 predetermined breaking line
23 positioning seat

The invention claimed is:

1. A badge assembly (10) for being connected to an airbag cover, comprising: a retaining plate (20) comprising a plurality of clip seats (21), and a badge (10) comprising a design component (15) and a logo component (14), the logo component (14) comprising a carrier element (13) and a decoration element (12), the carrier element (13) being stationarily attached to the decoration element (12) to prevent relative movement between the carrier element (13) and the decoration element (12) when the badge assembly (10) is connected to the airbag cover, the design component (15) having an annular configuration and including radially opposed logo seats (16) configured to receive the logo component (14), the design component (15) comprising a plurality of clip connectors (11) configured to extend through a front plate of the airbag cover and be received in the clip seats (21) of the retaining plate (20) to clip-connect the design component (15) to the retaining plate (20) and clamp the airbag cover between the design component (15) and the retaining plate, the design component (15) being a hold-down device for the logo component (14) via the logo seats (16).

2. The badge assembly according to claim 1, wherein the decoration element (12) includes a material different from that of the carrier element (13), wherein the decoration element (12) is formed from at least one of metal, aluminum, an aluminum sheet, and a plastic material.

3. The badge assembly according to claim 1, wherein the decoration element (12) is glued, crimped, clamped, pressed or locked with the carrier element (13).

4. The badge assembly according to claim 1, wherein the carrier element (13) forms a logo component (14) capable of being arranged inside a design component (15) of the badge (10) with the decoration element (12).

5. The badge assembly according to claim 1, wherein the logo seats (16) are delimited toward a front side of the badge (10) so that the logo component (14) can be fixed to the retaining plate (20) by the design component (15).

6. The badge assembly according to claim 1, wherein the logo seats (16) are arranged on an inner periphery of the design component (15).

7. The badge assembly according to claim 1, wherein the decoration element (12) is shaped as a cap and includes four side faces and one front face.

8. A vehicle steering wheel comprising a badge assembly according to claim 1.

9. The badge assembly (10) according to claim 1, wherein the logo component (14) extends across a space defined by the annular design component (15).

10. The badge assembly (10) according to claim 1, wherein the decoration element (12) is connectable to the carrier element (13), the carrier element (13) comprising opposite end portions configured to be received in the logo seats (16) and supporting the logo component (14) with the decoration element (12) being presented facing away from the front plate of the airbag cover.

11. The badge assembly (10) according to claim 1, wherein the design component (15) is configured such that the logo seats (16) face the front plate of the airbag cover in an installed condition of the badge assembly (10).

12. The badge assembly (10) according to claim 1, wherein the entire logo component (14) is fixedly connected to the design component (15) when the design component (15) is clip-connected to the retaining plate (20).

13. The badge assembly according to claim 1, wherein the carrier element (13) and the decoration element (12) are formed in one piece and constitute the logo component (14), the logo component being capable of being arranged inside a design component (15) of the badge (10).

14. The badge assembly according to claim 13, wherein the one piece comprises a plastic material which is coated with a metallic layer.

15. The badge assembly according to claim 13, wherein the design component (15) includes a plurality of positioning pins (11) which are connectable non-detachably to positioning seats (21) of the retaining plate (20).

16. The badge assembly according to claim 1, wherein the retaining plate (20) includes at least one predetermined breaking line (22).

17. The airbag cover according to claim 16, wherein the front plate includes a tear line, wherein the at least one predetermined breaking line of the retaining plate (20) is oriented along the tear line and is aligned with the tear line, respectively.

18. An airbag cover, especially for a steering wheel, comprising a badge assembly according to claim 1, wherein the badge assembly is connected to a front plate of the airbag cover.

19. An airbag module comprising an airbag cover according to claim 18.

20. A vehicle steering wheel comprising an airbag cover according to claim 18.

21. An airbag module comprising a badge assembly according to claim 1.

22. A vehicle steering wheel comprising an airbag module according to claim 21.

23. A badge assembly (10) for being connected to an airbag cover, comprising: a retaining plate (20) comprising a plurality of clip seats (21), and a badge (10) comprising a design component (15) and a logo component (14), the design component (15) having an annular configuration and including radially opposed logo seats (16) configured to receive the logo component (14), the design component (15) comprising a plurality of clip connectors (11) configured to extend through a front plate of the airbag cover and be received in the clip seats (21) of the retaining plate (20) to clip-connect the design component (15) to the retaining plate (20) and clamp the airbag cover between the design component (15) and the retaining plate, the design component (15) being a hold-down device for the logo component (14) via the logo seats (16), wherein the logo component (14) comprises positioning pins (17) configured to extend through the airbag cover and engage positioning seats (23) on the retaining plate (20) to align the badge assembly (10) relative to retaining plate (20).

24. The badge assembly according to claim 23, wherein the carrier element comprising the positioning pins is permanently connected to the decoration element.

25. A badge assembly (10) for being connected to an airbag cover, comprising: a retaining plate (20) comprising a plurality of clip seats (21), and a badge (10) comprising a design component (15) and a logo component (14), the logo component (14) including a carrier element (13) and a decoration element (12) tightly connected to each other, the carrier element (13) comprising positioning pins (17) configured to extend through the front plate of the airbag cover and engage positioning seats (23) on the retaining plate (20), the decoration element (12) including a material different from that of the carrier element (13), the decoration element (12) being shaped as a cap and encompassing the carrier element (13) on several sides, the design component (15) comprising a plurality of clip connectors (11) configured to extend through a front plate of the airbag cover and be received in the clip seats (21) of the retaining plate (20) to clip-connect the design component (15) to the retaining plate (20) and clamp the airbag cover between the design component (15) and the retaining plate, wherein the design component (15) is a hold-down device for the logo component (14) via the logo seats (16).

26. The bade assembly according to claim 25, wherein the entire logo component (14) is fixedly connected to the design component (15) when the design component (15) is clip-connected to the retaining plate (20).

* * * * *